April 9, 1940.  E. A. CORBIN, JR  2,196,203
HYDRAULIC CLUTCH
Filed Sept. 28, 1938  3 Sheets—Sheet 1

INVENTOR
ELBERT A. CORBIN, JR.
BY
Louis Necho
ATTORNEY

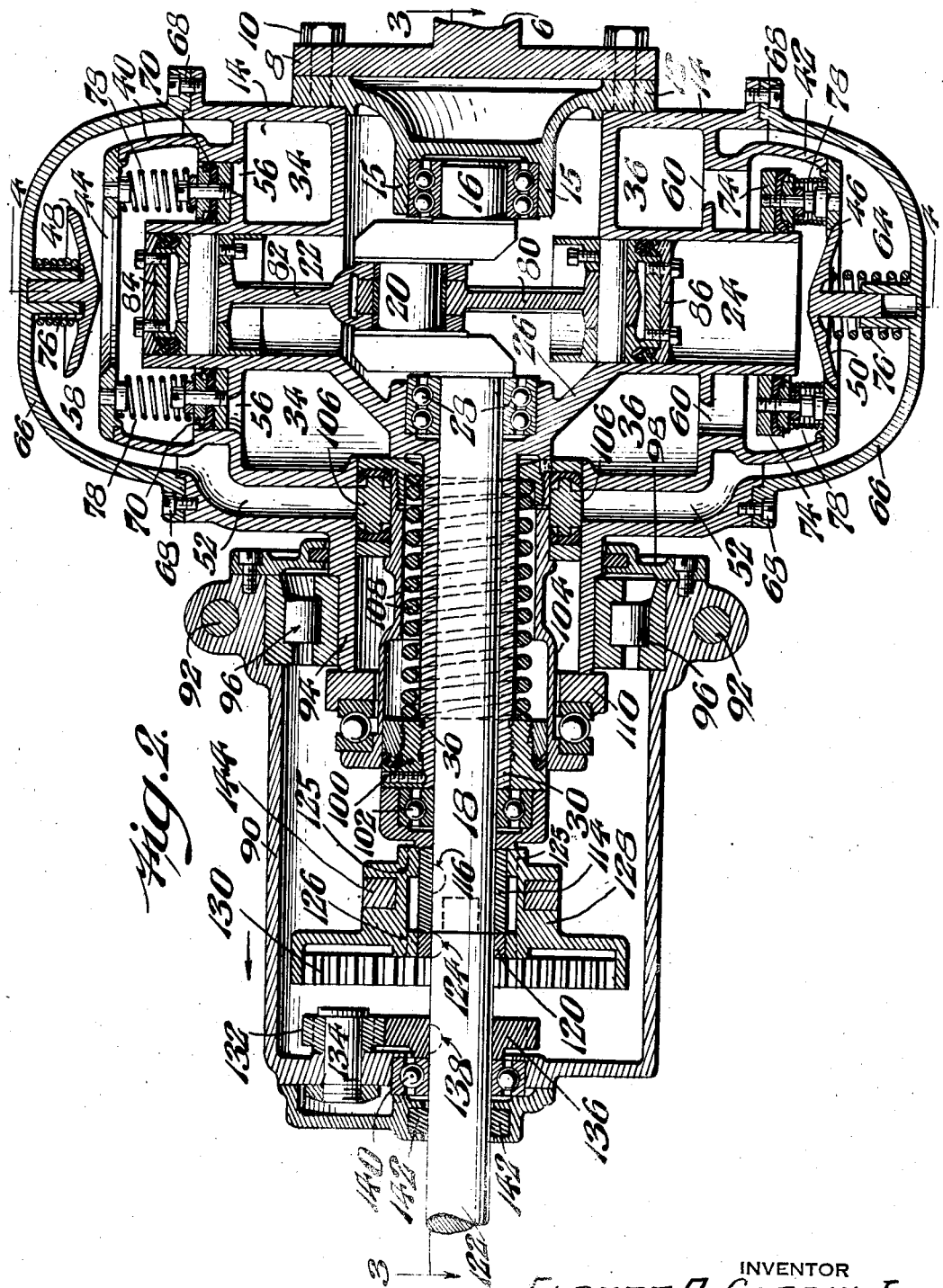

April 9, 1940. E. A. CORBIN, JR 2,196,203
HYDRAULIC CLUTCH
Filed Sept. 28, 1938 3 Sheets-Sheet 3
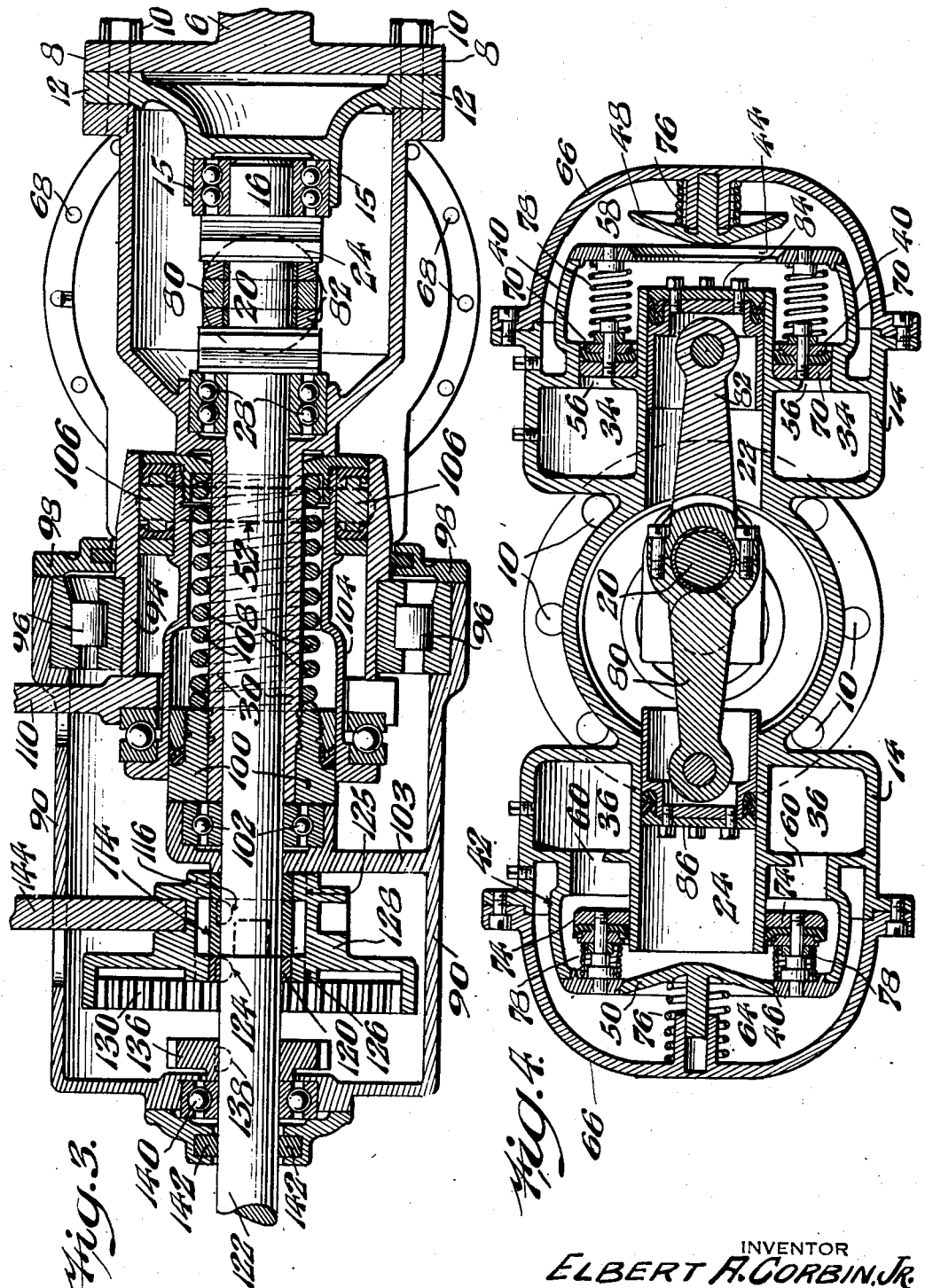
INVENTOR
ELBERT A. CORBIN, JR.
BY
Louis N. Echo
ATTORNEY Patented Apr. 9, 1940

2,196,203

UNITED STATES PATENT OFFICE 2,196,203

HYDRAULIC CLUTCH

Elbert A. Corbin, Jr., Lansdowne, Pa., assignor of one-half to William C. Biddle, Lansdowne, Pa.

Application September 28, 1938, Serial No. 232,061

2 Claims. (Cl. 192—60)

My invention relates to a new and useful hydraulic clutch or transmission whereby power may be transmitted from a driving to a driven member without the use of gears and also without the use of friction, wet, or dry clutch plates such as are now universally used in automotive vehicles and other engines where power must be transmitted to produce variable speeds in other than electrically driven power plants.

In automotive vehicle engines and the like where friction clutches are employed, the indirect drive is resorted to through the medium of gears having certain ratios, and it is necessary to start the vehicle moving through one set of gears known as "low" and then to shift as momentum is picked up to a second set of gears and so on into third speed or "high". This is due to the nature of the clutch or transmission now in use in which the engagement of the clutch plates of the driving and driven shafts must be accomplished in degrees or steps as otherwise excessive torque and slippage will occur which would be destructive of the clutch and other parts of the mechanism. Furthermore, in the conventional friction clutch there is a certain amount of slippage whenever the clutch plates are allowed to engage regardless of the particular speed, all of which results in limiting the life of the clutch plates. Also, the stepped or graduated increase in speed from standstill to maximum is necessitated because of the impracticability of getting the vehicle to move at the speed of the engine directly from a standstill position.

It is therefore the object of my invention to produce a hydraulic transmission which employs no friction plates and which is therefore free from the corresponding wear and tear, and which is also capable of transmitting power at a gradual and continuously increased rate as opposed to the distinct degrees of speed attained by the change from one set of gears having a definite ratio to another set of gears having a different definite ratio.

My invention further relates to a hydraulic clutch or transmission which can be used as a brake when a vehicle is climbing a grade, but, which, while holding the vehicle against rolling backwardly down hill, also maintains the vehicle in position ready to start up hill when desired, whereas in conventional vehicles it is necessary to de-clutch the engine from the vehicle and to apply the brake to hold the vehicle against rolling backwards. When the vehicle is again ready to start up hill the releasing of the brake and the clutching of the driving to the driven shaft is a delicate operation which is only performed correctly by a very small number of motorists and in the great majority of cases the vehicle rolls back two or three feet or more during the movement of the foot from the brake pedal, during the engagement of the clutch, to the accelerator which is admittedly undesirable. Furthermore, the necessary rapid clutch of the driving to the driven shaft causes excessive slippage and corresponding wear and tear on the clutch plates.

My invention still further relates to a clutch or transmission which permits of the use of a simplified but adequate mechanism for putting the vehicle in reverse. Also my hydraulic clutch can be operated by the left foot clutch pedal now in use, or it can be connected for automatic operation by the actuation of the accelerator or engine throttle.

In the accompanying drawings:

Fig. 2 represents a view similar to Fig. 1 showing the hydraulic clutch mechanism in its full operative position and the other parts in the position in which the vehicle would travel forward.

Fig. 3 represents a section on line 3—3 of Fig. 2.

Fig. 4 represents a section on line 4—4 of Fig. 2.

Figure 1:
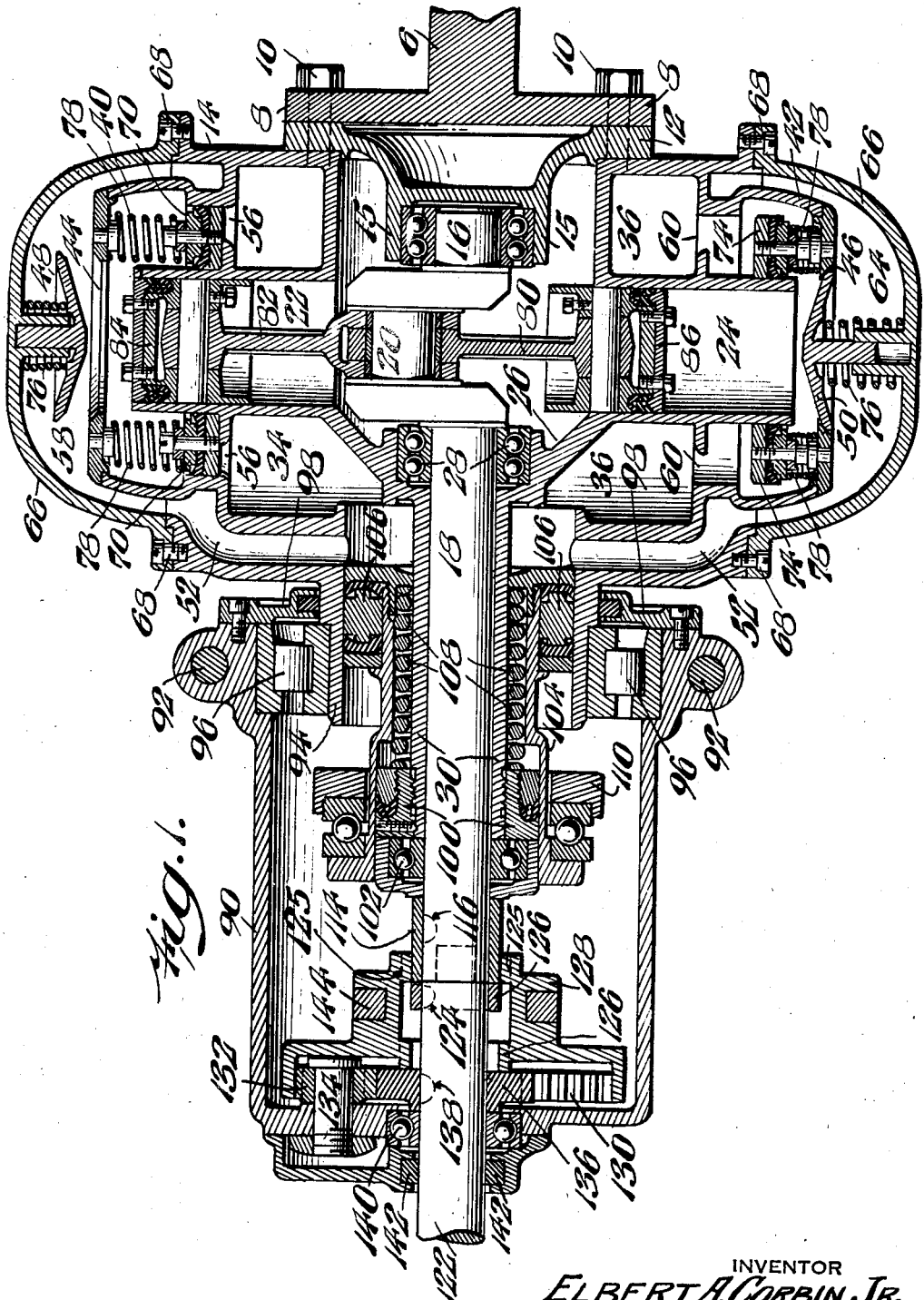
Fig. 1 represents a horizontal cross section of a hydraulic clutch or transmission embodying my invention, the same being shown in the inoperative position, and also showing the parts in the position in which the vehicle would travel in reverse if the clutch mechanism were in its operative position.

Referring to the drawings in which like reference characters indicate like parts, 6 designates the crank shaft of an internal combustion engine or the like, and is provided with the plate 8. The plate 8 is secured by the bolts 10 to the plate 12 and also to the adjacent wall of the casing 14. The plate 12 has an inward extension 15 which is provided with suitable anti-friction bearings for the end 16 of the crank shaft 18 which is provided with the throw 20. The casing 14 has formed integrally within it the piston chambers 22 and 24. From the corresponding walls of the chambers 22 and 24 extends the hub 26 which is provided with anti-friction bearings 28 and which also extends to form the sleeve 30 which supports the shaft 18. Also formed integrally within the casing 14 are the annular chambers 34 and 36, as well as the extensions 40 and 42 which are provided with openings 44 and 46 forming seats for the valves 48 and 50. Intermediate the walls of the chambers 34 and 36 and the wall of the casing 14 is provided the passage 52. The chamber 34 communicates through the annular openings 56 and 44 with the chamber 58 and passage 52, and the chamber 36 communicates through the ports 60 and 46 with the chamber 64 and the passage 52. This communication is established through either of the valve openings 44 or 46 only when either of the valves 48 and 50 is raised above its seat as shown at the top of Fig. 2. The chambers 58 and 64 are formed by the extension casings 66 which are suitably bolted at 68. The annular ports 56 and 60 are normally closed by the annular valves 70 and 74 which are urged to their closing position by the springs 78. Similarly, the valves 48 and 50 controlling the openings 44 and 46 are normally urged to their closing position by the springs 76. Mounted on the throw 20 of the crank shaft 18 are the connecting rods 80 and 82 which carry suitable pistons 84 and 86 which reciprocate in the chambers 22 and 24 respectively. 90 designates a casing which is bolted at 92 to the chassis of the vehicle in any suitable manner. The hub extension 94 of the casing 14 rotates against the bearings 96. 98 designates a suitably packed cover for the casing 90. 100 designates a stop collar which is suitably secured to the sleeve 30 surrounding the shaft 18 and which serves as an abutment for the adjacent end of the spring 108. In order to support the rear end of the shaft 18 I provide the bearing 102 which is carried by the rib, spider, or web 103 which is integral with or suitably secured to the inner wall of the casing 90 as best seen in Fig. 3. Against the exterior of the stop collar 100 and the bearing 102 is adapted to slide the outer sleeve 104 which carries at its inner end the annular valve 106, which, when in the position shown in Fig. 2 completely closes the passage 52 and obstructs the flow of fluid therethrough from that half of the casing 14 above the longitudinal axis of the shaft 18 (as viewed in Fig. 2) to the lower half of the casing as viewed in the same figure. While the vehicle is in motion the valve ring 106 is retained in the closing position shown in Fig. 2 by the spring 108 by the operating arm 110. The operating arm 110 is not fully shown in the drawings for the reason that it may assume any desired shape and may terminate in a pedal similar to the conventional clutch pedal or in a lever accessible to the operator of the vehicle or other mechanism.

Referring to Fig. 2 in which the hydraulic clutch is shown in its operative position and in which the vehicle provided with this clutch is in position to move forward, it will be seen that I utilize the sleeve 114 which is keyed at 116 to the shaft 18 and also the sleeve 120 which is keyed to the shaft 122 at 124. The sleeves 114 and 120 are keyed at 125 and 126 respectively to the hub 128 which carries the ring gear 130. With the gear 130 in the position shown in Fig. 3 the shaft 18 is integrated with the shaft 122 by the keys 125 and 126 and the shaft 122 will rotate as one with the shaft 18. If it is desired to put the vehicle in reverse the hub 128 is slid in the direction of the arrow in Fig. 2 until it assumes the position shown in Fig. 1 in which the gear 130 engages the pinion 132 carried on the stud 134. The pinion 132 engages the gear 136 which is keyed to the shaft 122 at 138. The shaft 122 is also provided with any suitable bearings 140 and with any desired packing 142. When the hub 128 is moved from the position shown in Fig. 2 to the position shown in Fig. 1, it will be seen that the key 126 is disengaged so that the shaft 122 is no more integrated or compelled to rotate with the shaft 18, and the motion of the shaft 122 due to the gear 130, pinion 132 and gear 134 will be opposite to the direction of the rotation of the shaft 18. The hub 128 is operated by means of any suitable arm or lever 144 which, like the arm 110 which operates the ring valve 106, is also not shown in detail since it can assume any desirable shape or position such as a foot pedal or hand lever accessible to the operator of the mechanism.

The operation is as follows:

With the parts as shown in Fig. 1, that is, with the passage-way 52 open, free communication is established between the opposite halves of the casing 14 on either side of the shaft 18 and the casing 14, as a unit, is free to rotate on its bearings with the rotation of the crank shaft 6. The throw 20 of the shaft 18 remains stationary and the pistons 82 and 86 reciprocate freely in their respective chambers 22 and 24 with each rotation of the casing 14. The casing 14 is filled with any suitable liquid such as oil except that the chamber in which the throw 20 of the shaft 18 revolves is only provided with the oil necessary for lubrication. With the interior of the casing 14 filled with oil the rotation of the casing 14 with the shaft 6 and the reciprocation of the pistons 22 and 24 in their respective chambers simply results in displacing or shifting the oil back and forth from one side of the casing to the other. When the spring 108 has been released to move the annular ring 106 into the position shown in Fig. 2, the free circulation of the liquid in the casing 14 is prevented and the rotation of the casing 14 results in actuating the throw 20 of the shaft 18 and hence rotating the latter. This is due to the fact that the passage-way 52 is closed and the tendency of the piston 84 and 86 to reciprocate and transfer the oil from one side of the casing to the other is prevented. This integrates the casing 14 with the shaft 18 and if the parts are as shown in Fig. 1 the shaft 122 will rotate in the same direction as the shaft 18. Obviously, if by manipulation of the arm 110 the ring valve 106 is permitted only partially to obstruct the opening 52, the flow of the oil from one side of the casing to the other is not completely prevented and hence the shaft 18 is rotated at a slower rate than it would be if the passage-way 52 is completely closed. From this it will be seen that the speed of the vehicle can be regulated by the amount of obstruction of the passage-way and that the maximum speed which corresponds to a direct drive between the shaft 6 and the shaft 18 will be attained when the passage-way 52 is completely closed. A vehicle equipped with this hydraulic clutch and climbing up hill needs no brake in the event of stoppage being necessary half way up the hill, since, by proper manipulation of the arm 110, the passage-way 52 can be obstructed just enough to produce enough pressure against the pistons 84 and 86 to maintain them in the position of tending to turn the shaft 18, but not quite doing so, and since the shaft 18 is connected at its rear end to the driving differential, which is usually carried by the rear axle, it follows that the rear wheels are not permitted to turn either way. When the operator is ready to start up hill again, the passage-way 52 is further obstructed until the pressure within the casing 14 is enough to cause the shaft 18 to rotate. It will be noted that when the piston 86 is moving inwardly in its cylinder 24 the piston 84 is moving outwardly and the liquid expelled by the piston 84 is sucked in by the piston 86. During the inward movement of the piston 86 the valve 50 closes the opening 46 and the liquid enters the cylinder 24 through the annular port 60, the pressure produced by the piston 84 and the suction of the piston 86 serving to open the annular valve 74 against the tension of the spring 78 as shown at the lower half of Fig. 2 and vice versa.

While I have shown two cylinders 22 and 24, it is obvious that the number of cylinders and pistons employed is not the controlling feature and that the same can be varied at will.

Having thus described my invention, what I claim as new and desire to secure by Letters Patent is:

1. A hydraulic transmission comprising a driving shaft, an outer casing secured to and rotatable with said shaft, a driven shaft journalled in said casing, piston chambers formed in said casing, pistons mounted on said driven shaft for reciprocation in said piston chambers, inner casings surrounding said piston chambers and disposed between them and said outer casing, there being openings in the walls of said inner casings, valves for controlling said openings in accordance with the reciprocation of said pistons, there being a central port for establishing connection between the inner and outer casings near one piston chamber and the corresponding inner and outer casings near an opposite piston chamber, a valve for partially or completely closing said center port, and means for controlling said valve.

2. A hydraulic transmission comprising a driving shaft, an outer casing secured to and rotatable with said shaft, a driven shaft journalled in said casing, piston chambers formed in said casing, pistons mounted on said driven shaft for reciprocation in said piston chambers, inner casings surrounding said piston chambers and disposed between them and said outer casing, there being openings in the walls of said inner casings, spring-pressed valves carried by said inner and outer casings for controlling said openings in accordance with the reciprocation of said pistons, there being a central port for establishing connection between the inner and outer casings near one piston chamber and the corresponding inner and outer casings near an opposite piston chamber, a spring-pressed valve slidable on said driven shaft for partially or completely closing said central port, and means for controlling said valve.

ELBERT A. CORBIN, Jr.